(12) United States Patent
Aoki

(10) Patent No.: US 6,345,543 B1
(45) Date of Patent: Feb. 12, 2002

(54) SEAT WEIGHT MEASURING APPARATUS

(75) Inventor: Hiroshi Aoki, Shiga (JP)

(73) Assignee: Takata Corporation (JP)

( * ) Notice: Subject to any disclaimer, the term of this patent is extended or adjusted under 35 U.S.C. 154(b) by 0 days.

(21) Appl. No.: 09/413,531

(22) Filed: Oct. 6, 1999

(30) Foreign Application Priority Data

Oct. 6, 1998 (JP) .......................................... 10-297555

(51) Int. Cl.⁷ ................................................ G01L 1/22
(52) U.S. Cl. ................................................ 73/862.474
(58) Field of Search ..................... 73/862.474, 862.331, 73/862.582, 862.325, 768; 701/45, 49; 177/136, 144; 280/735; 180/783, 273; 340/667; 248/618; 384/47

(56) References Cited

U.S. PATENT DOCUMENTS 6,056,079 A * 5/2000 Cech et al. .................. 180/273
6,069,325 A * 5/2000 Aoki ............................ 177/136
6,070,115 A * 8/2000 Oestreicher et al. ........... 701/45
6,109,117 A * 8/2000 Stanley et al. ......... 73/862.325

FOREIGN PATENT DOCUMENTS

| JP | H06-58706 | 3/1994 |
| JP | H9-156666 | 1/1996 |
| JP | H10-121627 | 4/1998 |

* cited by examiner

Primary Examiner—Benjamin R. Fuller
Assistant Examiner—Octavia Davis
(74) Attorney, Agent, or Firm—Foley & Lardner (57) ABSTRACT

A seat weight measuring apparatus capable of reducing the working cost and the assembly cost and improving its heat resistance and its corrosion resistance. A load sensor has a mechanism for receiving at least a part of the seat weight and converting the weight into an electrical signal. A strain gauge of the load sensor includes a lower insulating layer, a wiring layer, a resistor layer, and an upper insulating layer, which are sequentially formed on a sensor member.

17 Claims, 5 Drawing Sheets

SEAT WEIGHT MEASURING APPARATUS

BACKGROUND OF THE INVENTION

1. Field of the Invention

The present invention relates to an apparatus for measuring the weight of a vehicle seat including the weight of a passenger sitting thereon and, more particularly, to a seat weight measuring apparatus that is both highly durable and inexpensive.

2. Description of Related Art

Automobiles are equipped with seat belts and airbags to secure safety for passengers. In recent years, there is a trend for controlling the operation of such safety devices according to the weight (body weight) of a passenger for improved performance of seat belts and airbags. For example, the amount of gas to be introduced into the airbag, an airbag inflating speed, or a pre-tensioning of the seat belt may be controlled depending on the weight of a passenger. To do so, a device is needed to measure the weight of the passenger sitting on the seat. One such device is disclosed in Japanese Patent Applications No. H9-156666 and No. H10-121627, which involve arranging load sensors (load cells) at four corners of seat rails, obtaining vertical load acting on the load cells as voltage by an electric circuit, and summing them to determine the seat weight including the weight of the passenger.

The load sensors of the seat weight measuring apparatus described above are preferably of a small-sized type with a measuring capacity about 50 kg. Such load sensors may include: sensors having a strain gauge attached to (or formed on) a sensor plate that flexes when it is subjected to a load; piezoelectric type sensors; and capacitance type sensors which detect displacements of an elastic member that flexes upon receiving a load.

A metallic thin film gauge is generally employed as the strain gauge. The method of manufacturing the metallic thin film gauge is as follows: a metallic thin film, which has been attached to a resin film is etched to form a gauging portion composed of wirings and thin lines; then, the gauging portion is sandwiched between resin films and then mounted to a spring steel. The temperature coefficient (coefficient representing the relation between temperature and linear expansion) between the spring steel and the metallic thin film is adjusted to obtain a load sensor having excellent strain characteristics and temperature coefficient.

The aforementioned strain gauge, however, is costly to manufacture due to the complex manufacturing process. Further, a lot of man-hours are required to bond the strain gauge accurately and uniformly, thereby further increasing the assembly cost. Moreover, because the voltage output by the strain gauge is low, a noise shield and a sensitive amplifier are also required, which results in additional costs.

The gauging portion consisting of metallic wirings and thin lines is sandwiched between resin films to improve its heat resistance (generally from −35° C. to +80°C.) and its corrosion resistance. A sufficient additional seal is required to avoid the possibility of an electrical insulation defect, which occurs under a severe working condition such as the condition inside a vehicle, i.e. high-temperature and high-humidity.

The above problems with the known apparatuses are not intended to be exhaustive, but are among many tending to reduce the effectiveness of those known apparatuses. Other noteworthy problems may exist; however, those presented above should be sufficient to demonstrate that the known apparatuses will admit to worthwhile improvement.

SUMMARY OF THE INVENTION

It is an object of the invention to provide a seat weight measuring apparatus that alleviates the aforementioned difficulties.

It is another object of the invention to provide a seat weight measuring apparatus for measuring the weight of the vehicle seat including the weight of a passenger sitting thereon, having a reduced working cost and assembly cost.

It is another object of the invention to provide a seat weight measuring apparatus having improved heat resistance and corrosion resistance.

A preferred embodiment of the invention that is intended to accomplish at least some of the foregoing objects includes a seat weight measuring apparatus for measuring a weight of the vehicle seat including the weight of a passenger sitting thereon. The apparatus includes a load sensor that receives at least a part of the seat weight and converts the seat weight into an electrical signal. The load sensor includes a sensor member which is elastically deformable upon receiving at least a part of the seat weight, and a strain gauge arranged on a surface of the sensor member. The strain gauge includes a lower insulating layer, a wiring layer, a resistor layer, and an upper insulating layer sequentially formed on the sensor member.

Additional objects and advantages of the invention will be set forth in the following description, and in part may be obvious by practicing the invention. The objects and advantages of the invention may be realized and obtained through the instrumentalities and combinations pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description, serve to explain the principles of the invention.

FIGS. 4(A) and 4(B) show the construction of a seat weight measuring apparatus according to an embodiment of the present invention, in which

DETAIL DESCRIPTION OF THE PREFERRED EMBODIMENT

A seat weight measuring apparatus of the present invention is an apparatus for measuring the weight of the vehicle seat including the weight of a passenger sitting thereon and is characterized by comprising: a load sensor disposed inside the seat or between the seat and a vehicle body for receiving at least a part of the seat weight and converting the weight into an electrical signal, wherein the load sensor has a sensor member which is elastically deformable when received at least a part of the seat weight, and a strain gauge arranged on a surface of the sensor member, wherein the strain gauge includes a lower insulating layer, a wiring layer, a resistor layer, and an upper insulating layer, which are sequentially and selectively formed on the sensor member.

Due to its laminated construction, the strain gauge can be formed, for example, by printing, thus improving productivity. The strain gauge is formed directly on the sensor member, thereby facilitating the assembly working. In addition, since the upper insulating layer is applied as a protective layer, provision of an additional seal can be eliminated.

It should be understood that the seat weight measuring apparatus in this specification is directed basically to measure the weight of a passenger on the seat. Accordingly, the seat weight measuring apparatus in this specification includes an apparatus which measures only the weight of the passenger by canceling the weight of the seat itself.

It is preferable that the sensor member is made of material capable of resisting repeated elastic deformation with a strain of 0.1% or more.

Because no permanent strain is developed on such material with strain of 0.1% or more, the sensor member made of such material can be used as a seat sensor.

According to the present invention, it is preferable that the respective layers are formed by applying insulating paste, wiring paste, or resistive paste into a certain pattern and hardening the paste.

The layers can be formed, for example, by printing, thus improving productivity. In addition, since the layers contain vitreous material, the heat resistance and the corrosion resistance are thereby improved.

According to the present invention, it is preferable that the sensor member is made of a stainless steel and the respective layers are hardened by baking.

Because the sensor member is made of a stainless steel having the property of heat resistance, the sensor member can be baked at the same time as baking of the respective layers at high temperature.

According to the present invention, it is preferable that the wirings and terminals for connecting other additional parts are also formed by lamination.

The wirings and the terminals for connecting the additional parts are formed by lamination, thereby improving productivity.

According to the present invention, it is preferable that the strain of the strain gauge is 1500 $\mu\epsilon$ or less when a load is exerted on the load sensor. It is also preferable to further include a displacement restriction mechanism for restricting the strain on the sensor member to be 1500 $\mu\epsilon$ or less.

The strain of the strain gauges is limited within the aforementioned range, preventing the strain gauge and the sensor member from being broken.

It is preferable that the strain of the strain gauge is in a range from 1000 $\mu\epsilon$ to 1500 $\mu\epsilon$ when the maximum load (for example, 100 newtons) is exerted on the load sensor. As the output of the strain gauge is sufficiently high, high accuracy measurement can be obtained.

According to the present invention, it is preferable that the surface strain of the sensor member around the strain gauge be made uniform by the configuration of the sensor member.

The surface strain of the sensor member is made uniform, thereby improving the accuracy of measurement and preventing variation of the sensitivity.

According to the present invention, it is preferable that the strain gauge comprises a bridge circuit and the values of resistance on an arm of the bridge circuit are within a range from 500 $\Omega$ to 5,000 $\Omega$.

The value of resistance is in the aforementioned range, preventing heating due to increase in current, and stabilizing the weight detection.

Figure 1:
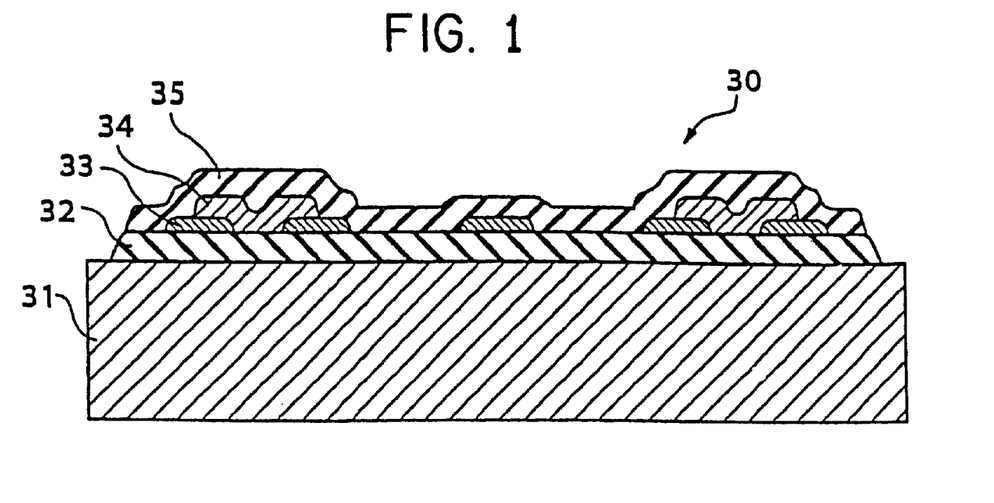
FIG. 1 is a sectional side view taken along a line I—I of FIG. 2, illustrating an arrangement example of a sensor (strain gauge) of a seat weight measuring apparatus according to an embodiment of the present invention.

Referring now to the drawings, and initially to FIG. 1, there will be seen a sensor or strain gauge 30 of a seat weight measuring apparatus according to an embodiment of the invention. The sensor 30 includes a sensor plate or spring member 31 as a base and a lower insulating layer 32 formed on the sensor plate 31 for electrical insulation. Selectively formed on the insulating layer 32 is a wiring layer 33. Further selectively formed on the wiring layer 33 is a resistor layer 34 to compose a strain gauge. In addition, an upper insulating layer 35 is applied over these layers to protect them. In this manner, the electrical circuit including resistors is directly laminated on the spring member 31, thereby reducing the working cost and the assembly cost and further improving the heat resistance and the corrosion resistance.

Figures 2A, 2B:
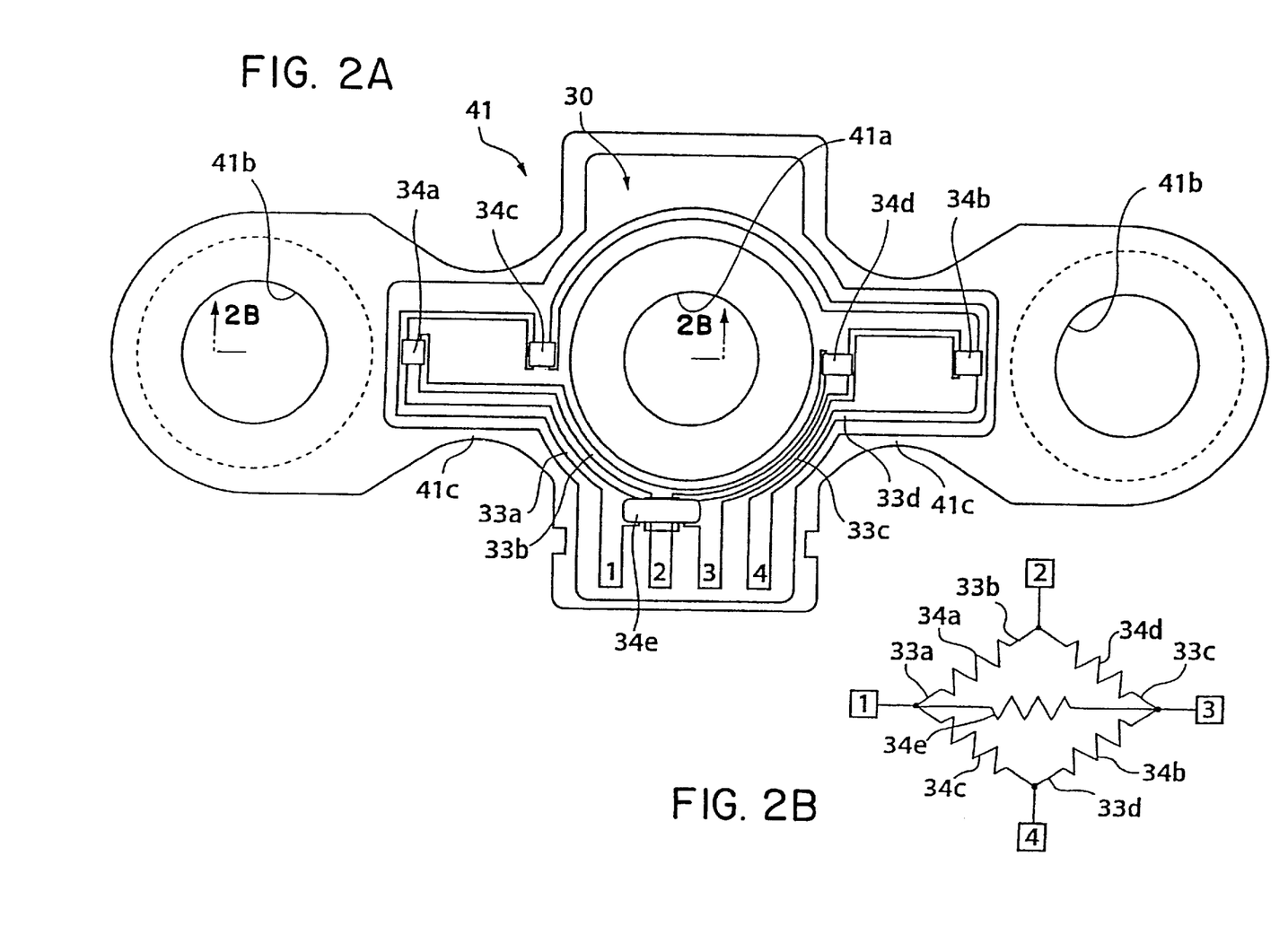
FIG. 2(A) is a plan view of a sensor plate having the sensor shown in FIG. 1
FIG. 2(B) is a circuit diagram of the sensor.

As shown in FIGS. 2(A) and 2(B), the sensor plate 41 is a rectangular plate having round corners. In this embodiment, the sensor plate 41 is made of a stainless steel capable of resisting the repeated elastic deformation with strain of 0.1% or more and is 80 mm in overall length, 40 mm in width, and 3 mm in thickness. The sensor plate 41 is provided with a central hole 41a of 10 mm in diameter formed in the center thereof and bolt holes 41b of 8 mm in diameter formed in end portions thereof. The sensor 30 is formed around the central hole 41a and between the central hole 41a and the bolt holes 41b. R-shaped concavities are provided in opposite side edges of regions 41c between the central hole 41a and the bolt holes 41b. These concavities ensure positions to be deformed of the sensor plate 41, thereby preventing positional variation of distortion and stabilizing the sensitivity of the sensor 30.

The sensor 30 is substantially symmetrical about the center of the central hole 41a. That is, the sensor 30 is composed of four strain resistors 34a, 34b, 34c, and 34d. Two of strain resistors 34a, 34b, which are applied with tensile strain, are arranged near the bolt holes 41b (near the ends), while the other two strain resistors 34c, 34d, which are applied with compressive strain, are arranged near the central hole 41a (central side). The strain resistors 34a, 34b, 34c, and 34d are connected to each other by wirings 33a, 33b, 33c, and 33d to form a bridge circuit as shown in FIG. 2(B). Squares marked by numerals 1, 2, 3, 4 in FIGS. 2(A) and 2(B) are terminals.

Arranged between the strain resistors 34a, 34c and the strain resistors 34b, 34d is a sensitivity control resistor 34e. From the view of reliability of solder and mechanical stress relative to parts, the sensitivity control resistor 34e is soldered to connect the wirings in the form of a bridge at a location near terminals 1 and 3 out of positions to be deformed around the central holes 41a where it is hardly strained. Instead of the sensitivity control resistor 34e, an amplifier for amplifying a signal and temperature property control elements may be connected. Connecting terminals for other additional parts to adjust certain properties of the strain sensor may be formed on the sensor plate together with terminals for the strain sensor, thereby lowering the working costs and improving properties such as temperature drift, etc. The additional parts are to adjust sensitivity properties of the strain sensor, to protect the strain sensor electrically, and to lower output impedance of the strain sensor. Also, other additional parts may have connecting terminals formed on the identical substrate.

Here, in an on-vehicle system, decreasing the impedance of signal lines is important as well as the size of electrical outputs. Measures for opposing radio noise and current leakage due to dusts and water drops containing moisture and salt are also important. It is difficult to obtain suitable weight detection when the value of resistance of the sensor 30 is not reduced. Some strain resistors have a sheet resistance of 10 kΩ or more and high sensitivity, but the value of the resistance becomes large.

Because the measurement of the seat weight starts at the same time as the ignition of the engine, the stability at the starting is important. When the value of the resistance becomes too small, the currents flowing through the resistors are increased, causing slight drift due to heating. Therefore, the values of resistance composing a bridge (or a half bridge) are preferably within a range from 500 Ω to 5,000 Ω. It should be noted that the load may be obtained by conversion from deflection of the sensor plate 41 detected by electrical capacitance pressure sensors or Hall elements, instead of the detection of distortion of the sensor plate 41 being detected by the strain resistors 34a, 34b, 34c, and 34d.

Figure 3:
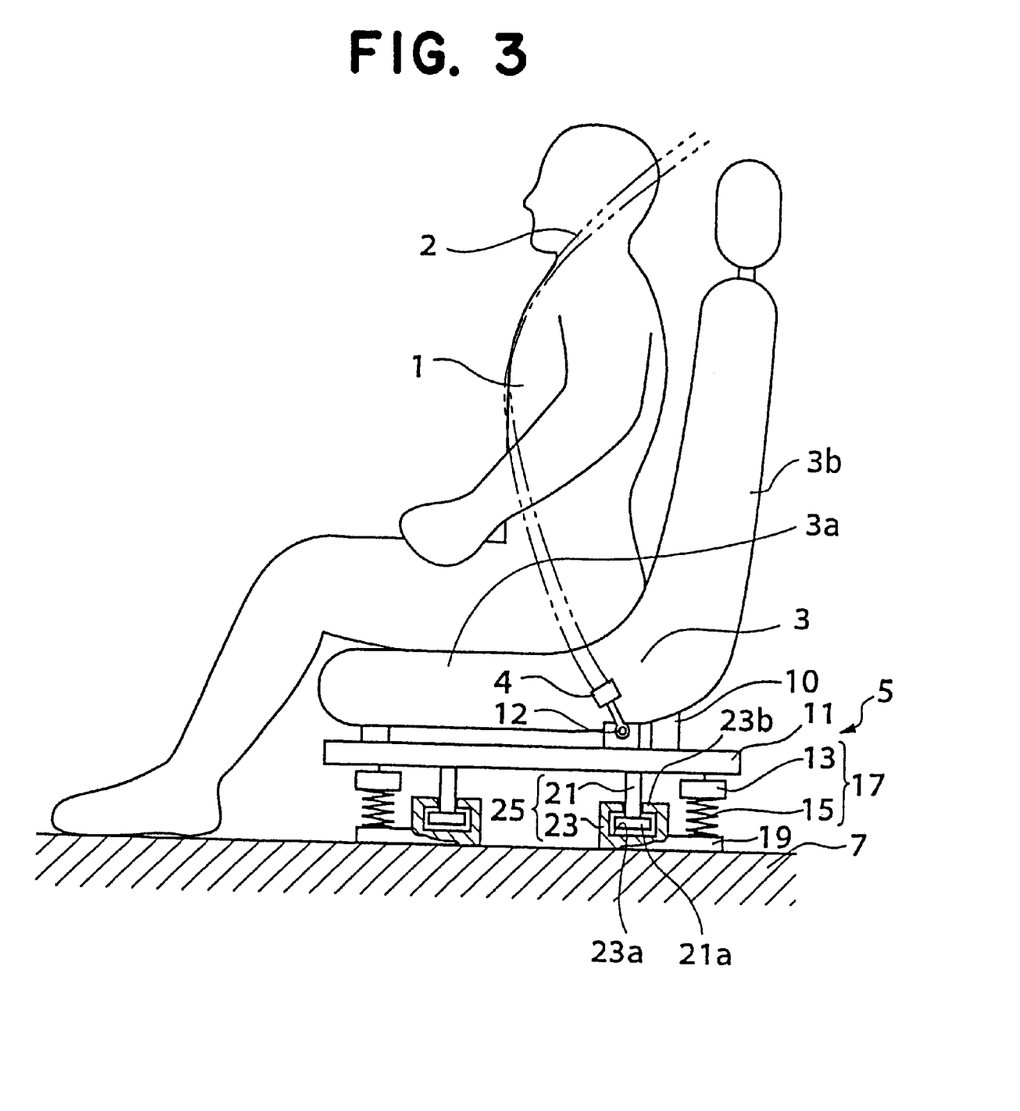
FIG. 3 is a side view schematically showing the overall construction of a seat weight measuring apparatus according to an embodiment of the present invention.

FIG. 3 is a side view schematically showing the overall construction of a seat weight measuring apparatus according to an embodiment of the present invention. The words front, rear, left and right refer to front, rear, left and right as seen by a passenger 1, respectively.

As seen in FIG. 3, there is a seat 3, a passenger 1 on the seat, and a seat weight measuring apparatus 5 installed below the seat. The seat 3 comprises a seat squab 3a on which the passenger 1 is seated, and a seat back 3b for supporting the back of the passenger. Seat adjusters 10 project from the bottom of the seat squab 3a at four locations, front and rear on both sides. While only two adjusters 10, front and rear on the left side, are shown in the figure, there are right side adjusters 10 on the far side of the seat 3. Such an illustrative relation is also true for other portions to be described below. The seat adjusters 10 are portions of the seat frame that project from the seat 3, capable of sliding the seat 3 along seat rails 11 in the longitudinal direction when adjusted by the passenger 1.

The seat rails 11 are members which extend in the longitudinal direction of a vehicle body and have a grooved cross section (not shown) in which the lower end portions of the seat adjusters 10 slide. There are two seat rails 11, one on each lateral side, under the seat squab 3a. In a conventional seat without seat weight measuring apparatus, the seat rails 11 are securely fixed by bolts to seat brackets of a chassis of a vehicle body. At a rear part of the seat rails 11, an anchoring portion 12 for fixing a buckle 4 of a seat belt 2 is provided. The anchoring portion 12 bears a tension of a seat belt 2. The anchoring portion 12 has a breaking load of 2300 newtons taking into consideration of a case of a vehicle collision.

Under the seat rail 11, two seat weight measuring apparatuses 5 are provided, one at front portion and one at rear portion of the seat rail. It should be noted that under the right side seat rail, there are also provided two seat weight measuring apparatuses 5 which are not shown. Thus, the seat weight measuring apparatuses 5 are provided at four locations, front and rear on both sides, below the seat 3.

Each of the seat measuring apparatuses 5 comprises a seat supporting mechanism 17 and a displacement restriction mechanism 25, and is arranged between the seat rails 11 and the seat fixing portions 19. In this embodiment, each of the seat supporting mechanisms 17 comprises a load sensor 13 and a deflection member 15, connected in series. The load sensor 13 detects the load received by the seat supporting mechanism 17. The deflection member 15 is a member for amplifying the displacement (movement) of the seat rail 11 upon loading of the passenger weight on the seat 3.

In this embodiment, each of the displacement restriction mechanisms 25 comprise a restriction bar 21 connected to the lower surface of the seat rail 11 and a restriction block 23 formed on the seat fixing portion 19. An end portion 21a of the restriction bar 21 is enlarged in diameter in a flange-like configuration. The restriction block 23 has a recess 23a inside thereof and a flange 23b, extending inward, formed at the upper end of the recess 23a. The end portion 21a of the restriction bar is accommodated in the recess 23a of the restriction block, keeping a certain gap on all longitudinal and lateral surfaces.

When an abnormal load is applied on the seat rails 11, deforming the load sensor 13 and the deflection member 15 over a certain limit, the end portion 21a of the restriction bar of the displacement restriction mechanism 25 abuts against an internal wall of the recess 23a of the restriction block. For instance, when the passenger 1 moving forward during a vehicle collision is restrained by the seat belt 2, the seat belt 2 receives a tension force caused by the inertia force of the passenger 1. At this time, the restriction bar 21 is pulled upward but the movement is stopped when the end portion 21a of the restriction bar abuts against the lower surface of the flange 23b of the restriction block. Thus, when the load sensor 13 receives a force exceeding a predetermined value (for instance, exceeding a measuring range), the excess load is born by the displacement restriction mechanism (load restriction mechanism) 25, instead of the load sensor 13. As a result, the breaking load requirement for the load sensor 13 can be very low, achieving the down-sizing and cost-reduction of the load sensor.

It is possible to restrain the strain of baked films (respective sensor layers) which are relatively fragile.

Hereinafter, the relation between the displacement restriction mechanism 25 and the deflection member 15 of the seat supporting mechanism 17 will be described. If the deflection member 15 is absent (if a rigid member is used), and deformation of load sensor 13 over the measuring range is in the order of 0.1 mm as described earlier, the gap between the end portion 21a of the restriction bar of the displacement restriction mechanism 25 and the recess 23a of the restriction block should also be in the order of 0.1 mm, because the end portion 21a of the restriction bar is required to abut against the internal surface of the recess 23a of the restriction block as soon as the load exceeds the measuring range, so that the excess load is born by the displacement restriction mechanism 25.

That is, the displacement restriction mechanism is required to have an operational precision in the order of 0.1 mm corresponding to the stroke of the load sensor 13, which in turn requires the parts dimensional precision and assembly precision to be on the order of 0.01 mm. This cannot be fulfilled at all with current dimensional precision of the parts around the vehicle seat, which mainly consist of pressed products. In short, the small deflection stroke of the load sensor 13 calls for a high dimensional precision in the displacement restriction mechanism 25 and those members used around it.

In this embodiment, the deflection stroke of the seat supporting mechanism 17 in the measuring range or loading range of the load sensor is amplified by the action of the deflection member 15 of the seat supporting mechanism 17. As a result, the dimensional precision and assembly precision requirements for members constituting the seat supporting mechanism 17 and the displacement restriction mechanism 25 can be alleviated.

Hereinafter, concrete examples of the seat supporting mechanism and the displacement restriction mechanism will be described.

Figure 4A:
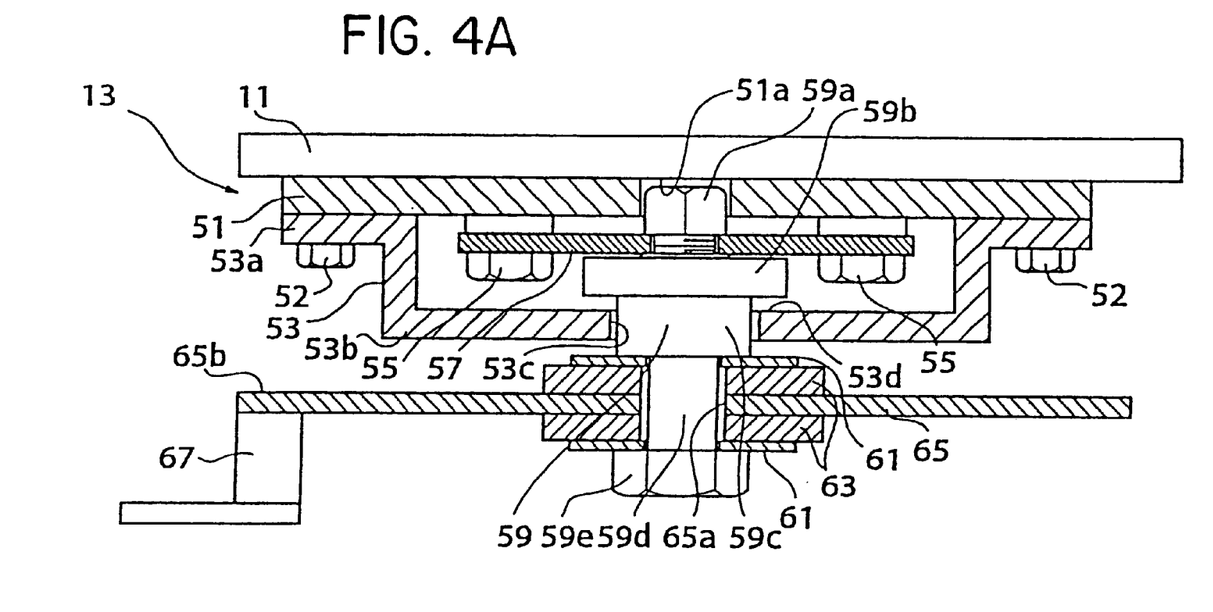
FIG. 4(A) is a general sectional side view and FIG. 4(B) is a plan view of a sensor plate.
Figure 4B:
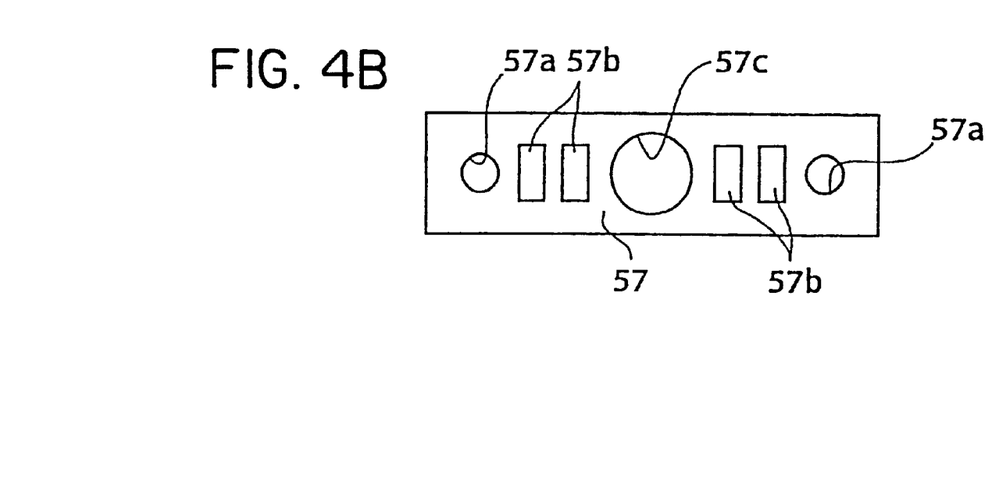

FIGS. 4(A) and 4(B) show the construction of a seat weight measuring apparatus according to a second embodiment of the present invention. Shown in the uppermost portion of FIG. 4(A) is a seat rail 11. Under the seat rail 11, a sensor frame upper plate 51 and a sensor frame 53 are fixed by means of bolts 52. The sensor frame upper plate 51 is a solid plate having a hole 51a at the center. The sensor frame 53 has a saucer-like configuration with a recessed central portion. Formed at the upper external periphery of the frame 53 is a flange 53a which is fixed to the sensor frame upper plate 51 by means of the bolts 52, as described above. The center of the bottom plate 53b of the sensor frame 53 is provided with a hole 53c.

A sensor plate 57 is fixed to the lower surface of the sensor frame upper plate 51 by means of bolts 55. The sensor plate 57 is made of a stainless steel and is a rectangular plate with a thickness of 3 mm, a width of 20 mm, and a length of 80 mm. As shown in FIG. 4(B), the sensor plate 57 is provided with a central shaft hole 57c formed in the central portion and with bolt holes 57a formed in both side portions. Attached to the upper surface of the sensor plate 57 are strain resistors 57b, a pair of them being attached on each the front and rear portions of the plate (left and right portions in FIG. 4(B)). These strain resistors 57b measure the load acting on the sensor plate 57 by detecting the strain of the plate 57.

Fitted into the hole 57c located at the center of the sensor plate 57 is a central shaft 59. The sensor plate 57 and the central shaft 59 are fixed to each other by means of a nut 59a. Inserted into the holes 57a located at both sides of sensor plate 57 are bolts 55 upward, fixing the sensor plate 57 to the sensor frame upper plate 51.

The central shaft 59 is a cylindrical shaft having several steps and flanges. The central shaft 59 includes, from its upper side, the upper nut 59a, a flange 59b, a sensor frame penetrating portion 59c, a small diameter portion 59d, and a lower nut 59e. The upper nut 59a fixes the sensor plate 57 as described above. The nut 59a enters into the central hole 51a of the sensor frame upper plate 51. In the nominal state, the gaps between the nut 59a and the hole 51a are, for example, 0.25 mm in the longitudinal direction and 0.5 mm in the radial direction. When the seat rail 11 receives a large force and the sensor plate 57 is deformed to some extent, the nut 59a abuts against the internal surface of the hole 51a. At this point, the further deformation of the sensor plate 57 is stopped. That is, the nut 59a on the central shaft and the central hole 51a of the sensor frame upper plate compose together the displacement restriction mechanism of the present invention.

The outer diameter of the flange 59b of the central shaft 59 is greater than the diameter of the central hole 53c of the sensor frame 53, the lower surface of the flange 59b facing the upper surface of the sensor frame bottom plate 53b with a gap of 0.25 mm in the nominal state. When the seat rail 11 receives a force acting upward and the deformation of the sensor plate 57 progresses, the sensor frame 53 is lifted and the central upper surface 53d of the frame bottom plate 53b abuts against the bottom surface of the central shaft flange 59b. Meanwhile, a gap of 0.7 mm exists between the outer periphery of the sensor frame penetrating portion 59c of the central shaft 59 and the inner periphery of the sensor frame central hole 53c in the nominal state. This portion also constitutes the displacement restriction mechanism of the present invention.

The small diameter portion 59d of the central shaft 59 extends downward and decreases in diameter stepwise. The nut 59e is screwed onto the end of the small diameter portion 59d. Fitted onto the outer periphery of the small diameter portion 59d are, from its upper side, a washer 61, a rubber washer 63, a sensor base 65, another rubber washer 63, and another washer 61. The washers 61 are made of metal. The rubber washers 63 expand and contract by about 0.5 mm in the sum of two sheets, upper and lower, for a load variation of about 50 newtons in the vertical direction. The rubber washers 63 serve to absorb dimensional difference and strain between the seat rail 11 and the seat fixing portion (a seat bracket 67). The sensor base 65 is a metal plate and comprises a lowermost member of the seat weight measuring apparatus of this embodiment. The upper and lower washers 61, the upper and lower rubber washers 63, and the sensor base 65 are retained between the lower step of the sensor frame penetrating portion 59c of the central shaft 59 and the lower nut 59e.

The end 65b of the sensor base 65 is fixed to the seat bracket 67 by means of a bolt not shown. The seat bracket 67 projects from the chassis.

The general action of the seat weight measuring apparatus according to the embodiment of FIGS. 4(A), 4(B) will be summarized.

The weight of a seat and a passenger loaded on the seat rail 11 are normally transmitted via the sensor plate 57 to the central shaft 59, the rubber washers 63, the sensor base 65, and the seat bracket 67. At this time, the sensor plate 57 deflects roughly proportional to the load which is detected by the strain resistors 57b to measure the load acting on the sensor plate 57 in the vertical direction. The weight of the passenger is obtained by summing the load measured by each load sensors, front and rear on both sides, and subtracting from the sum the known weights of the seat, the seat rail and the like. The strain of the strain resistor 57b should be 1500 $\mu\epsilon$ or less, preferably 1000 $\mu\epsilon$ when a load of 100 kgf is exerted on the load sensor.

Meanwhile, when an abnormal force exceeding the measuring range (for instance, 1500 $\Omega$0 or less) or load limit of the load sensor acts on the seat rail 11, the central shaft nut 59a abuts against the internal surface of the central hole 51a, or otherwise, the central shaft flange 59b or the sensor frame penetrating portion 59c abuts against the sensor frame bottom plate 53b. This action of the displacement restriction mechanism prevents the sensor plate 57 from excessive deformation while securely connecting the seat rail 11 and the seat bracket 67.

For eliminating the influence of noise under the on-vehicle circumstances, generally the electrical output should be increased to apply a deformation strain as large as possible to the sensor plate. For this, portions under the resistors for detecting deformation of the sensor plate are required to be deformed to obtain the maximum strain within a range allowed by the base and the laminated layers (sensor). When the strain is locally concentrated, however, the sensitivity is unsteady at the side to be applied with compressive strain of the sensor plate. In case of further localized concentration due to impact or the like, the strain on a portion may exceed the allowable limit and the portion may be broken. Therefore, to effectively utilize the allowable range for the sensor plate and the laminated layers, the sensor plate should be made in such a manner as to disperse the deformation stress and to unify the strain on the surface to obtain strain corresponding to 70% or more of the maximum strain about the resistors on the sensor plate.

Figure 5A:
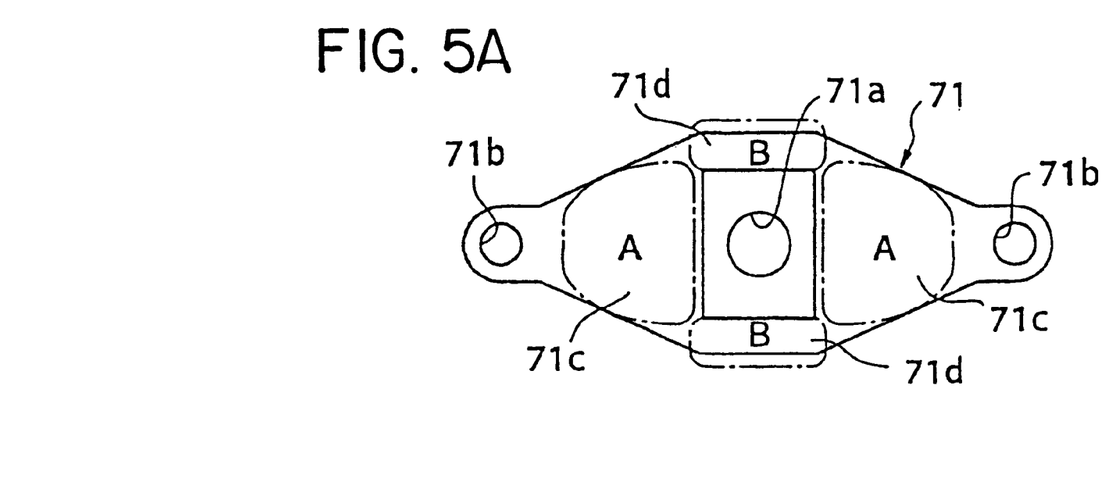
FIG. 5(A) is a plan view of an another sensor plate (sensor member) for the seat weight measuring apparatus according to an embodiment of the present invention.
Figure 5B:
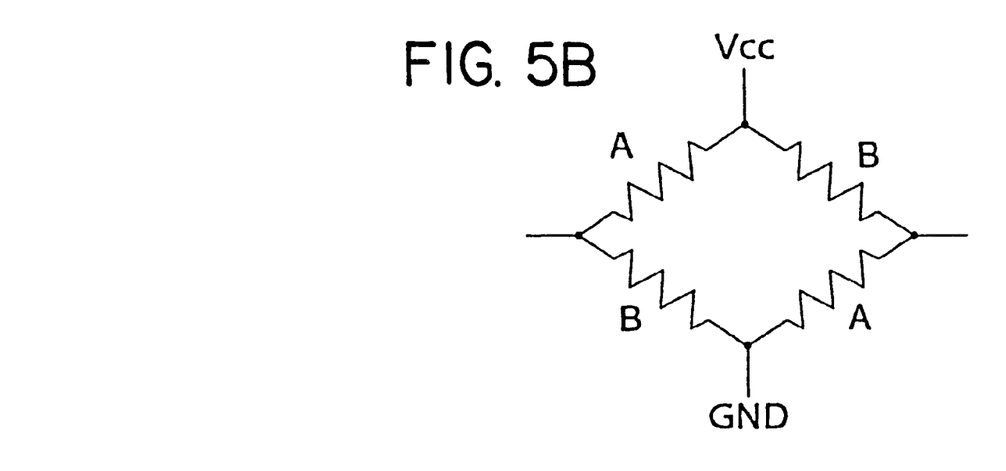
FIG. 5(B) is a circuit diagram of the sensor.

FIG. 5(A) is a plan view of an another sensor plate 71 for the seat weight measuring apparatus according to an embodiment of the present invention and FIG. 5(B) is a circuit diagram of the sensor. The sensor plate 71 is a rhomboidal plate. In this embodiment, the rhomboidal plate is made of a stainless steel and is 80 mm in overall length, 40 mm in width, and 3 mm in thickness. The sensor plate 71 is provided with a central hole 71a of 10 mm in diameter formed in the center thereof and bolt holes 71b of 8 mm in diameter formed in end portions thereof. Both end portions of the sensor plate 71 are tapered from the center to the ends thereof in such a manner as to make the surface strain of the sensor plate 71 uniform. In other words, the surface strain of the sensor member around the strain gauge can be uniform due to the configuration of the sensor member. Strain resistors are formed by lamination on areas A of the tapered portions where the strains on the surfaces are uniform and areas B at the center which receive no strain, and wirings are arranged by lamination to make a bridge circuit as shown in FIG. 5(B) so as to construct a sensor. These tapered portions ensure positions to be deformed of the sensor plate 71, thereby preventing positional variation of distortion and stabilizing the sensitivity of the sensor.

Though the sensor plates mentioned above are for bending load, sensor plates for tensile load can be applied for this invention.

Figure 6:
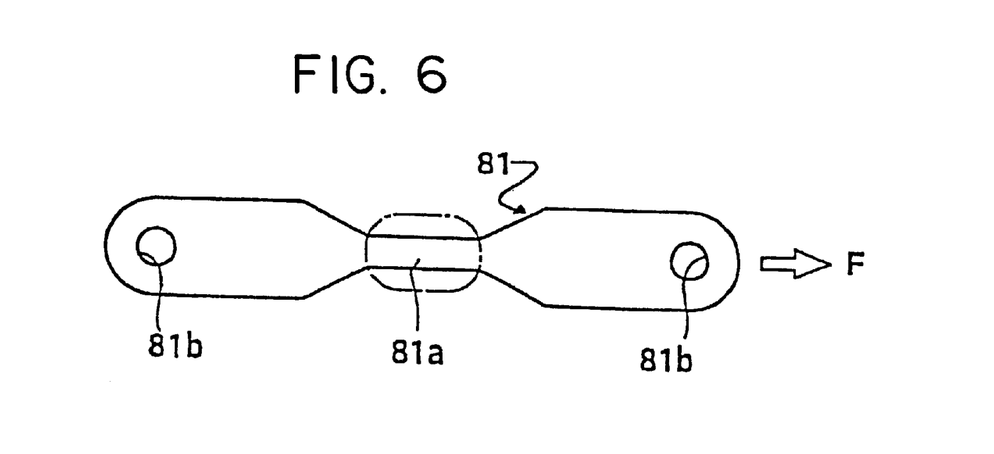
FIG. 6 is a plan view of a yet another sensor plate (sensor member) of the seat weight measuring apparatus according to an embodiment of the present invention.

FIG. 6 is a plan view of yet another sensor plate for the seat weight measuring apparatus according to another embodiment of the present invention.

The sensor plate 81 is a rectangular plate having round corners. In this embodiment, the rectangular plate is made of a stainless steel and is 80 mm in overall length, 40 mm in width, and 3 mm in thickness. The sensor plate 81 is provided with bolt holes 81b of 8 mm in diameter formed in end portions thereof. R-shaped concavities are provided in opposite side edges of a central region 81a of the sensor plates 81 in such a manner as to make the surface strain to be uniform. These concavities ensure positions to be deformed of the sensor plate 81, thereby preventing positional variation of distortion and stabilizing the sensitivity of the sensor.

The method of manufacturing the aforementioned sensor 30 will now be described as follows.

(1) Material of the spring member 31: SUS 430
(2) Formation of the insulating layer 32
   Process: screen printing
   Material: vitreous paste
   Thickness: 30 mm, Baking temperature: 850°
(3) Formation of the wiring layer 33
   Process: screen printing
   Material: Ag/Pt paste
   Thickness: 10 mm–20 mm, Baking temperature: 850°
(4) Formation of the insulating layer 34
   Process: screen printing
   Material: Ru resistive paste
   Thickness: 20 m, Baking temperature: 850°
(5) Formation of the insulating layer 35
   Process: screen printing
   Material: vitreous paste (LS-402® (Baking temperature 530 °), LS-453® ((Baking temperature 850 °) available from Tanaka Kikinzoku Company)

According to the above manufacturing method, sheet resistors not requiring high accuracy processing can be constructed by solid material of which resistivity is largely variable relative to the strain. The productivity can be improved with neither the fine etching process of a strain gauge nor the process for bonding the strain gauge to a spring member as the conventional one.

The present invention is not limited to the aforementioned embodiments, various changes and modifications may be made without departing from the spirit and scope stated in the claims.

As apparent from the above description, the present invention will exhibit the following effects.

Due to its laminated construction, the strain gauge can be formed, for example, by printing, thus improving the productivity and, in addition, reducing the working cost. The strain gauge is formed directly on a sensor member, thereby reducing the assembly cost. In addition, since an upper insulating layer is applied as a protective layer, the heat resistance and the corrosion resistance are improved. Wirings and terminals for connecting other additional parts are formed by lamination to make a load sensor, increasing the productivity and reducing the cost.

The existence of a displacement restriction mechanism prevents the strain gauge and the sensor member from being broken, enabling the load sensor to have a long life time.

Priority document, JP H10-297555, filed Oct. 6, 1998, is hereby incorporated by reference.

What is claimed is:

1. A seat weight measuring apparatus for measuring a weight of a vehicle seat including the weight of a passenger sitting thereon, comprising:
   a load sensor that receives at least a part of the seat weight and converts the seat weight into an electrical signal, said load sensor including:
      a sensor member which is elastically deformable upon receiving at least a part of the seat weight; and
      a strain gauge, for measuring a strain on said sensor member, arranged on a surface of the sensor member, said strain gauge including a lower insulating layer, a wiring layer, a resistor layer, and an upper insulating layer sequentially formed on said sensor member; and
   a displacement restriction mechanism for restricting the strain on said sensor member.

2. A seat weight measuring apparatus as claimed in claim 1, wherein said load sensor is disposed inside the seat.

3. A seat weight measuring apparatus as claimed in claim 1, wherein said load sensor is disposed between the seat and a vehicle body.

4. A seat weight measuring apparatus as claimed in claim 1, wherein said sensor member is made of a material capable of resisting a repeated elastic deformation with a strain of at least 0.1%.

5. A seat weight measuring apparatus as claimed in claim 1, wherein the lower insulating layer, the wiring layer, the resistor layer, and the upper insulating layer are formed by applying insulating paste, wiring paste, or resistive paste onto the sensor member.

6. A seat weight measuring apparatus as claimed in claim 1, wherein the lower and upper insulating layers include a vitreous material.

7. A seat weight measuring apparatus as claimed in claim 1, wherein said sensor member is made of a stainless steel.

8. A seat weight measuring apparatus as claimed in claim 1, wherein a plurality of wirings and terminals are laminated to the sensor member for connecting additional parts.

9. A seat weight measuring apparatus as claimed in claim 8, wherein the additional parts include a device that adjusts a sensitivity of the sensor, a device that adjusts temperature properties of the sensor, a device that protects the sensor electrically, and a device that lowers an impedance of the sensor.

10. A seat weight measuring apparatus as claimed in claim 1, wherein the strain of the strain gauge is 1500 $\mu\epsilon$ or less when a load is exerted on said load sensor.

11. A seat weight measuring apparatus as claimed in claim 1, wherein the strain of the strain gauge is in a range from 1000 $\mu\epsilon$ to 1500 $\mu\epsilon$ when a maximum load is exerted on the load sensor.

12. A seat weight measuring apparatus as claimed in claim 1, wherein the strain is limited by the displacement restriction mechanism to be 1500 $\mu\epsilon$ or less.

13. A seat weight measuring apparatus as claimed in claim 1, wherein a surface strain of the sensor member around the strain gauge is uniform.

14. A seat weight measuring apparatus as claimed in claim 1, wherein the strain gauge comprises a bridge circuit, wherein an arm of the bridge circuit measures values of resistance which are within a range from 500 $\Omega$ to 5,000 $\Omega$.

15. A seat weight measuring apparatus as claimed in claim 5, wherein the insulating paste, wiring paste, or resistive paste applied onto the sensor member is formed into a certain pattern and hardened.

16. A seat weight measuring apparatus as claimed in claim 7, wherein the respective layers are hardened by baking.

17. A seat structure for a motor vehicle, comprising:
a seat including a seat squab and a seat back extending from the seat squab;
seat rails mounted below the seat in a longitudinal direction;
a seat weight measuring apparatus provided below a front and a back of each seat rail, the seat weight measuring apparatus including:
a load sensor that detects a load positioned on the seat and generates an electrical signal in response to the load; and
a deflection member connected to the load sensor that amplifies the electrical signal; and
a displacement restriction mechanism for limiting the load detected by said load sensor.

* * * * *